United States Patent
Latorre-Martinez et al.

(10) Patent No.: US 9,454,963 B2
(45) Date of Patent: Sep. 27, 2016

(54) TEXT TO SPEECH METHOD AND SYSTEM USING VOICE CHARACTERISTIC DEPENDENT WEIGHTING

(71) Applicant: KABUSHIKI KAISHA TOSHIBA, Tokyo (JP)

(72) Inventors: Javier Latorre-Martinez, Cambridge (GB); Vincent Ping Leung Wan, Cambridge (GB); Kean Kheong Chin, Cambridge (GB); Mark John Francis Gales, Cambridge (GB); Katherine Mary Knill, Cambridge (GB); Masami Akamine, Cambridge (GB); Byung Ha Chung, Cambridge (GB)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 148 days.

(21) Appl. No.: 13/799,962

(22) Filed: Mar. 13, 2013

(65) Prior Publication Data

US 2013/0262109 A1  Oct. 3, 2013

(30) Foreign Application Priority Data

Mar. 14, 2012  (GB) .................................. 1204502.7

(51) Int. Cl.
*G10L 15/00* (2013.01)
*G10L 15/26* (2006.01)
(Continued)

(52) U.S. Cl.
CPC ............. *G10L 15/26* (2013.01); *G10L 13/033* (2013.01); *G10L 13/08* (2013.01); *G10L 2021/0135* (2013.01)

(58) Field of Classification Search
USPC ....................................... 704/235, 258, 260
See application file for complete search history.

(56) References Cited

U.S. PATENT DOCUMENTS

| 7,454,348 | B1 | 11/2008 | Kapilow et al. |
| 8,548,807 | B2 * | 10/2013 | Ljolje ................. G10L 15/07 345/473 |

(Continued)

FOREIGN PATENT DOCUMENTS

| CN | 101271687 A | 9/2008 |
| CN | 101471071 A | 7/2009 |

(Continued)

OTHER PUBLICATIONS

U.S. Appl. No. 14/458,556, filed Aug. 13, 2014, Kolluru, et al.

(Continued)

*Primary Examiner* — Barbara Reinier
(74) *Attorney, Agent, or Firm* — Oblon, McClelland, Maier & Neustadt, L.L.P.

(57) ABSTRACT

A text-to-speech method for simulating a plurality of different voice characteristics includes dividing inputted text into a sequence of acoustic units; selecting voice characteristics for the inputted text; converting the sequence of acoustic units to a sequence of speech vectors using an acoustic model having a plurality of model parameters provided in clusters each having at least one sub-cluster and describing probability distributions which relate an acoustic unit to a speech vector; and outputting the sequence of speech vectors as audio with the selected voice characteristics. A parameter of a predetermined type of each probability distribution is expressed as a weighted sum of parameters of the same type using voice characteristic dependent weighting. In converting the sequence of acoustic units to a sequence of speech vectors, the voice characteristic dependent weights for the selected voice characteristics are retrieved for each cluster such that there is one weight per sub-cluster.

20 Claims, 10 Drawing Sheets

(51) Int. Cl.
  *G10L 13/033* (2013.01)
  *G10L 13/08* (2013.01)
  *G10L 21/013* (2013.01)

(56) References Cited

U.S. PATENT DOCUMENTS

| | | | | |
|---|---|---|---|---|
| 8,571,871 | B1* | 10/2013 | Stuttle | G10L 13/033 704/260 |
| 8,990,089 | B2* | 3/2015 | Wouters | G06F 17/28 704/258 |
| 9,269,347 | B2* | 2/2016 | Latorre-Martinez | G10L 13/08 |
| 2003/0069728 | A1* | 4/2003 | Tato et al. | 704/231 |
| 2004/0225501 | A1* | 11/2004 | Cutaia | G10L 13/033 704/260 |
| 2007/0168189 | A1* | 7/2007 | Tamura | G10L 13/033 704/235 |
| 2012/0278081 | A1* | 11/2012 | Chun et al. | 704/260 |

FOREIGN PATENT DOCUMENTS

| | | | |
|---|---|---|---|
| EP | 0 515 709 A1 | 12/1992 | |
| GB | 2009/001464 | * 12/2010 | ............ G10L 13/02 |
| JP | 2012-529664 A | 11/2012 | |
| WO | WO 2004/012183 A2 | 2/2004 | |
| WO | WO 2004/012183 A3 | 2/2004 | |
| WO | WO 2005/071664 A1 | 8/2005 | |
| WO | WO 2010/142928 A1 | 12/2010 | |

OTHER PUBLICATIONS

Search Report issued May 27, 2013 in European Patent Application No. 13159291.7.
United Kingdom Search Report Issued Jul. 10, 2012, in Great Britain Patent Application No. 1204502.7, filed Mar. 14, 2012.
Office Action issued Feb. 4, 2015 in Chinese Patent Application No. 201310081220.7 (with English translation).
Office Action issued Feb. 12, 2014 in Japanese Patent Application No. 2013-051519 with English language translation.

* cited by examiner

TEXT TO SPEECH METHOD AND SYSTEM USING VOICE CHARACTERISTIC DEPENDENT WEIGHTING

FIELD

Embodiments of the present invention as generally described herein relate to a text-to-speech system and method.

BACKGROUND

Text to speech systems are systems where audio speech or audio speech files are outputted in response to reception of a text file.

Text to speech systems are used in a wide variety of applications such as electronic games, E-book readers, E-mail readers, satellite navigation, automated telephone systems, automated warning systems.

There is a continuing need to make systems sound more like a human voice.

Figure 1:
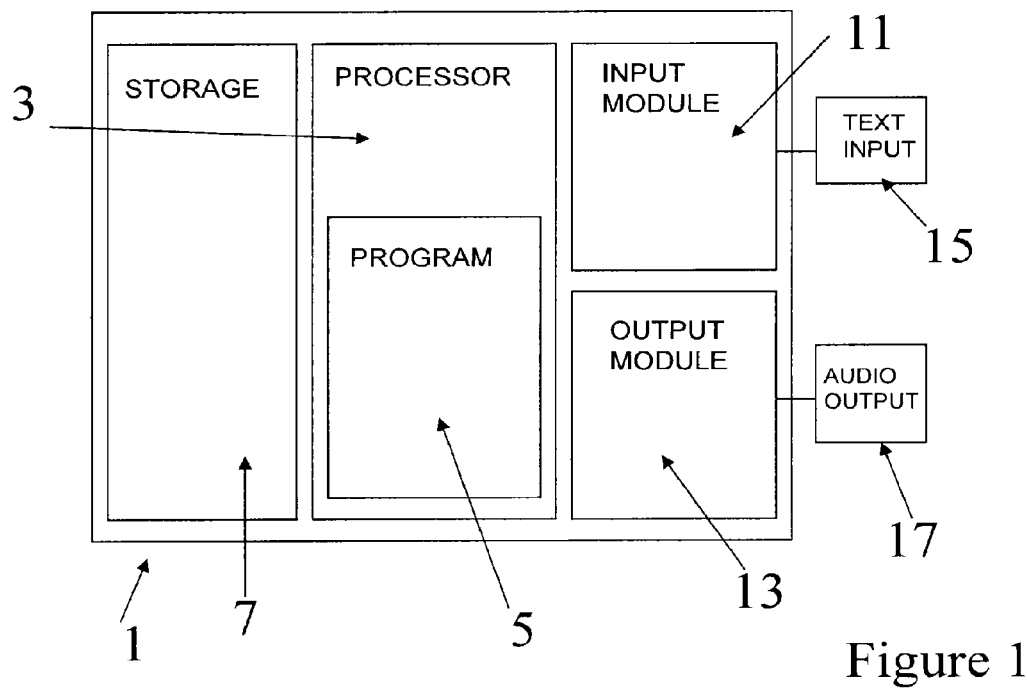
Figure 3:
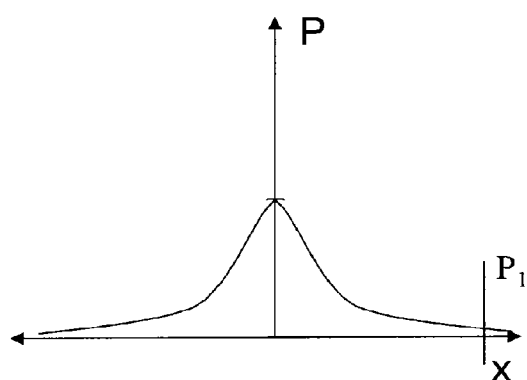
Figure 2:
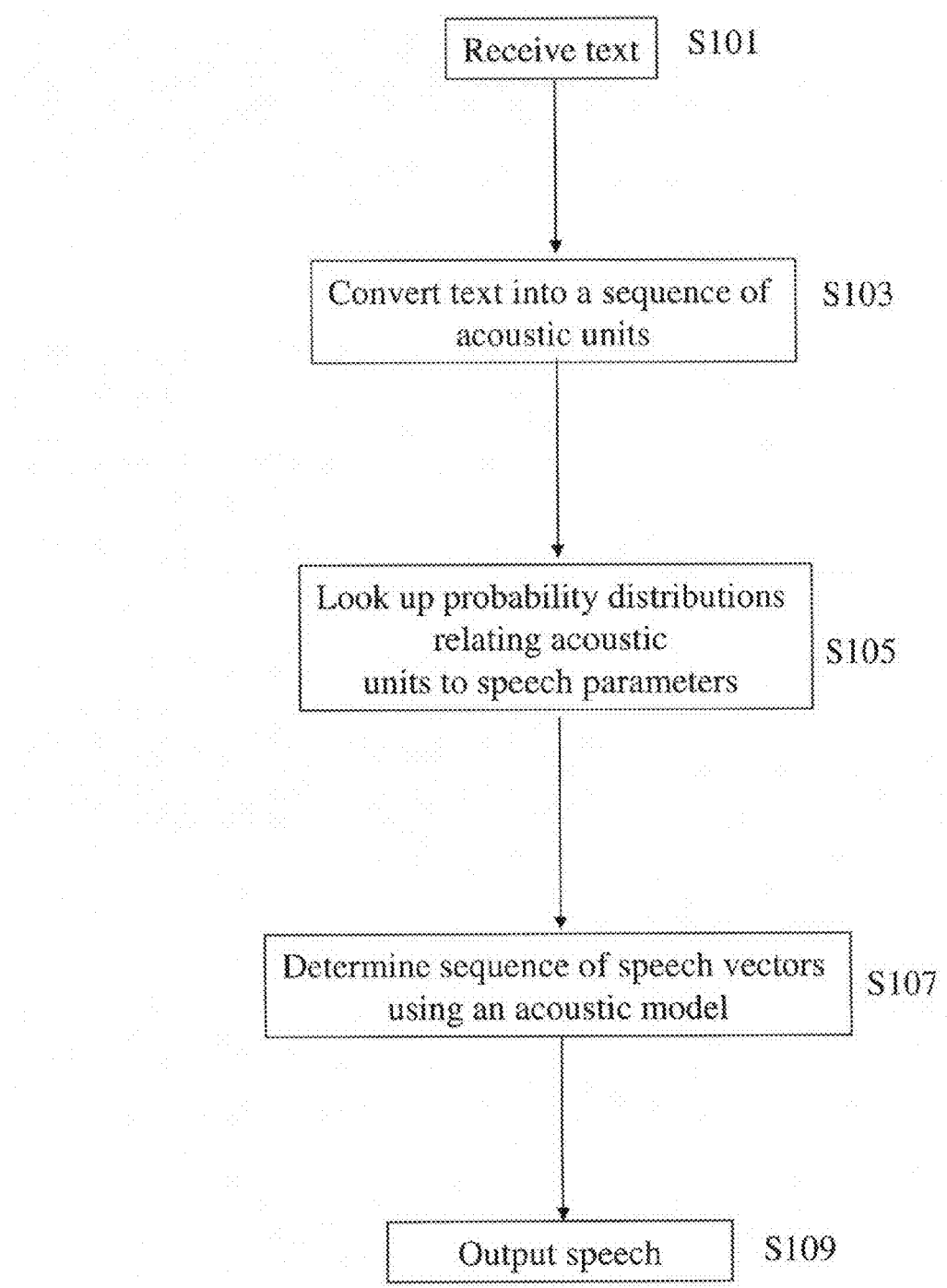
Figure 4:
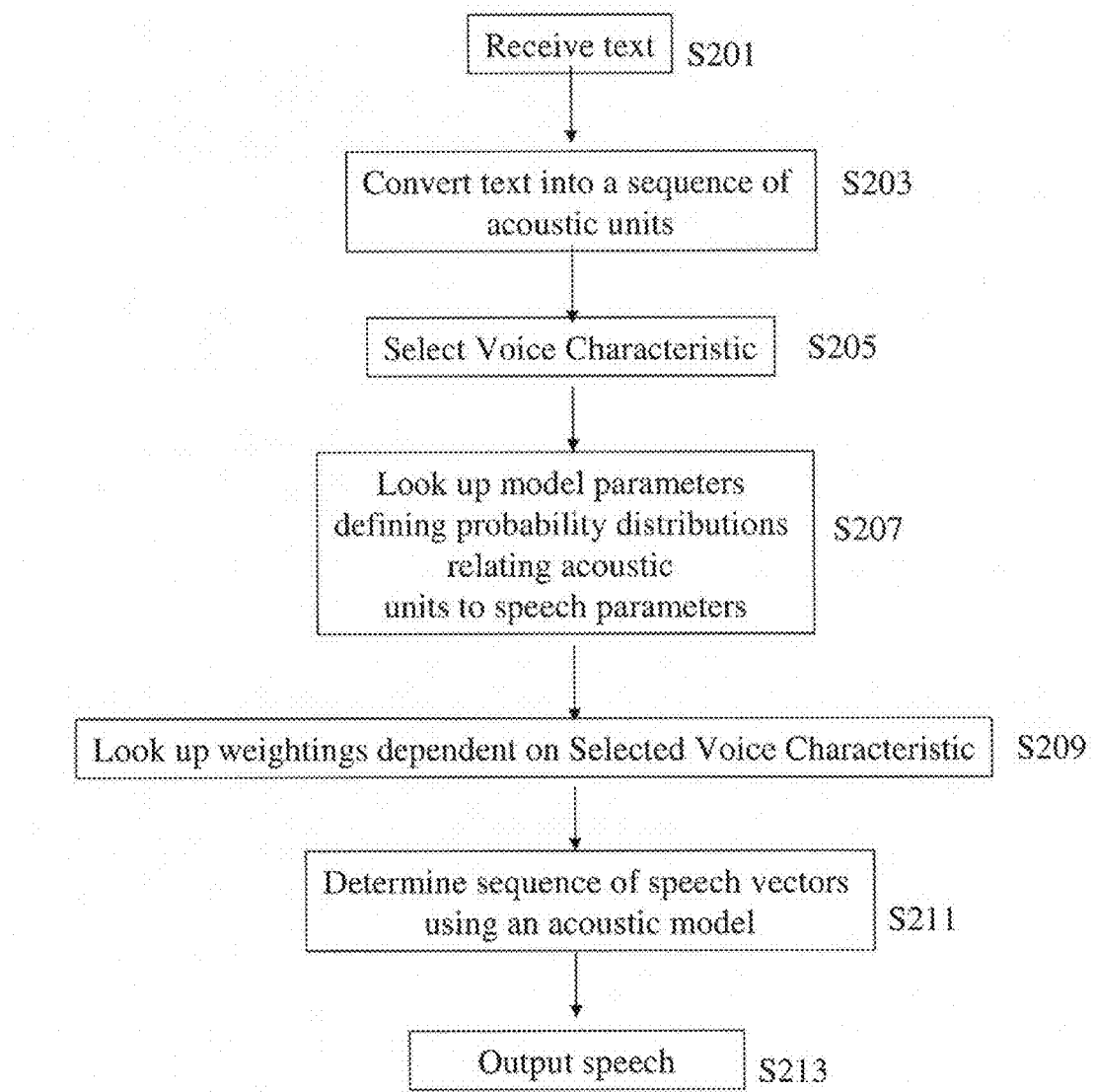
Figure 5:
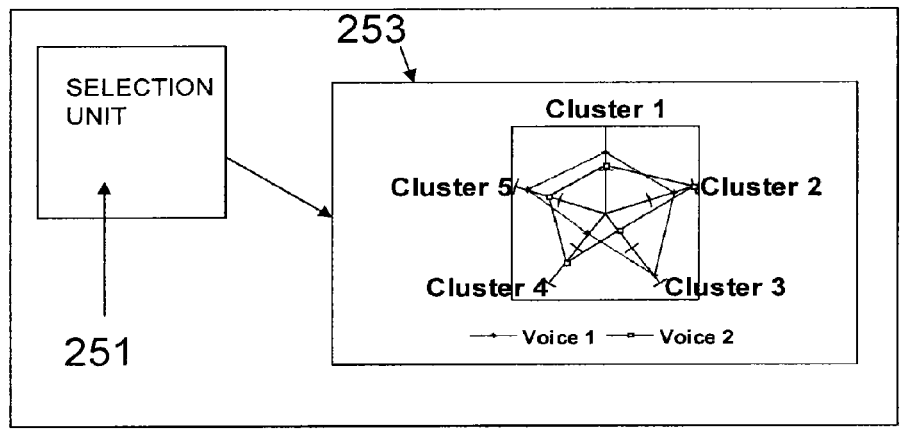
Figure 6:
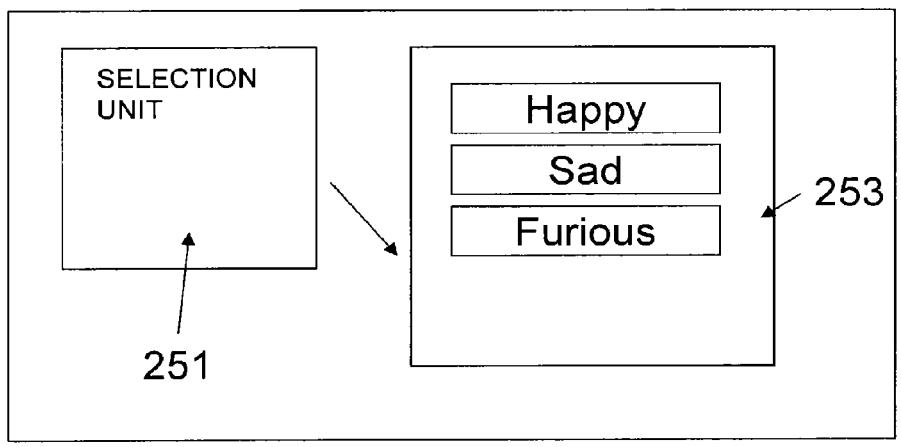
Figure 7:
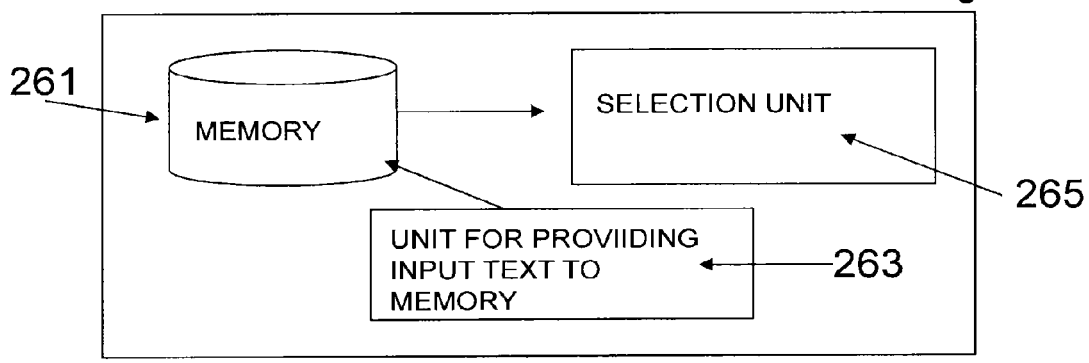
Figure 8:
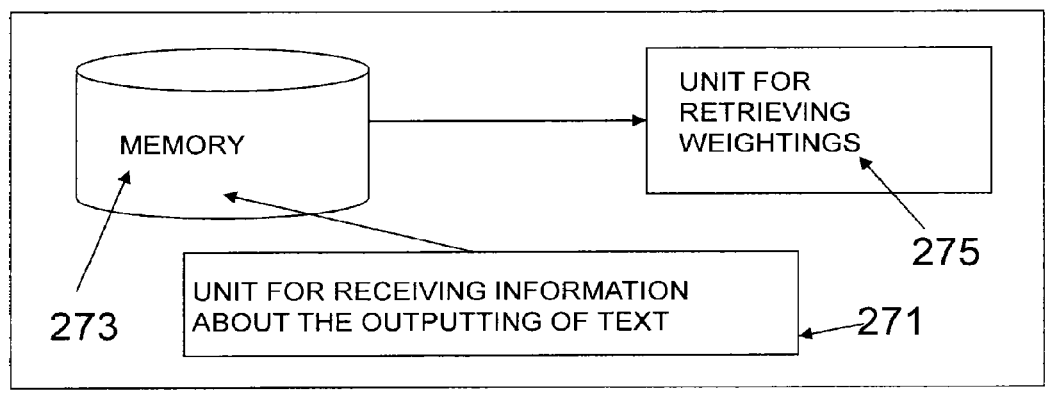
Figure 9A:
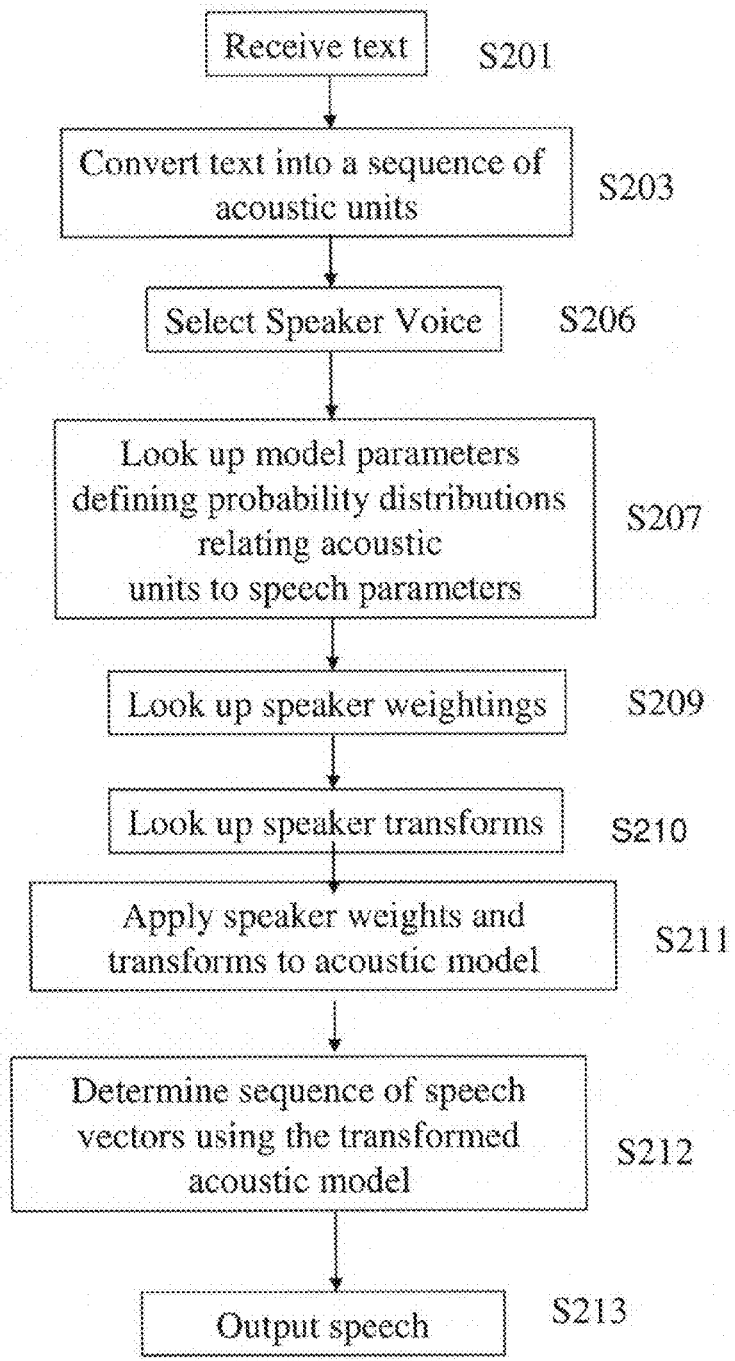
Figure 9B:
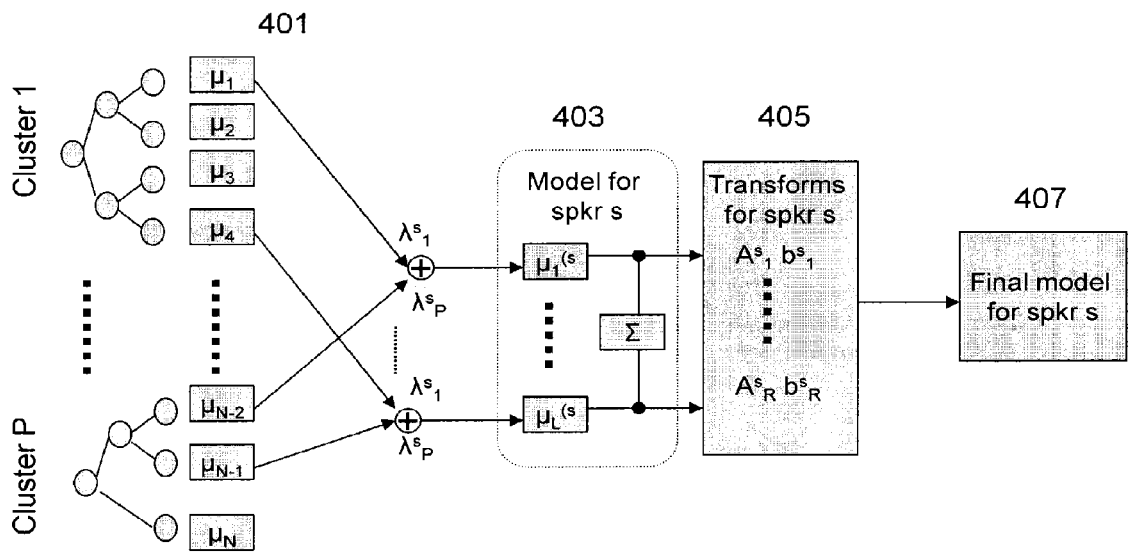
Figure 10:
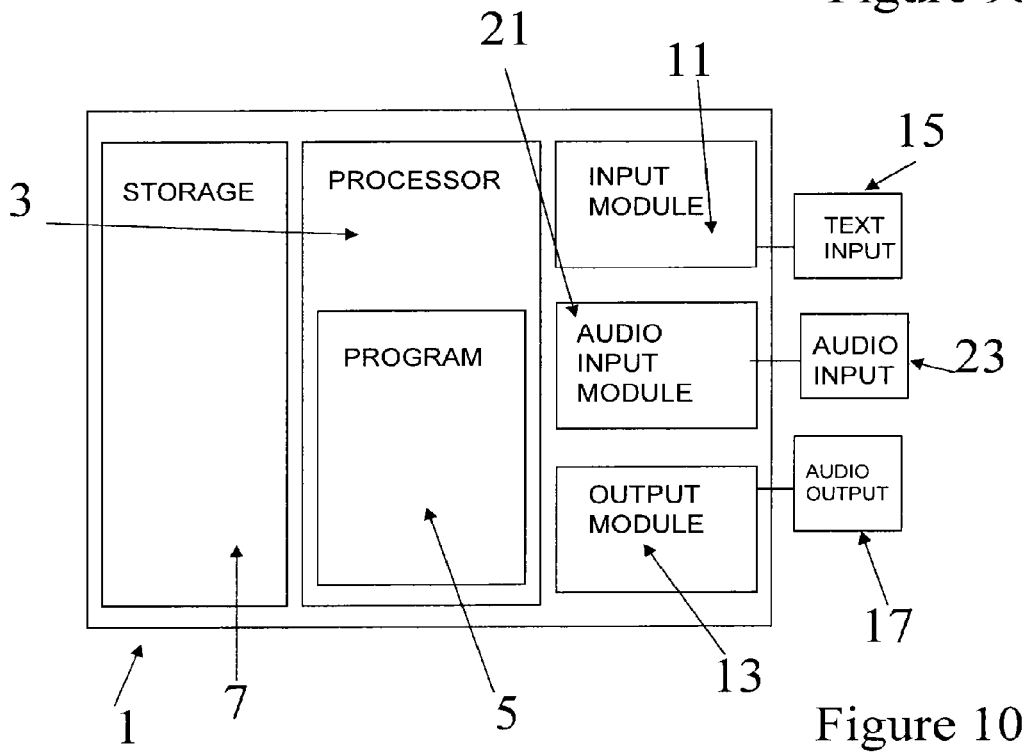
Figure 11:
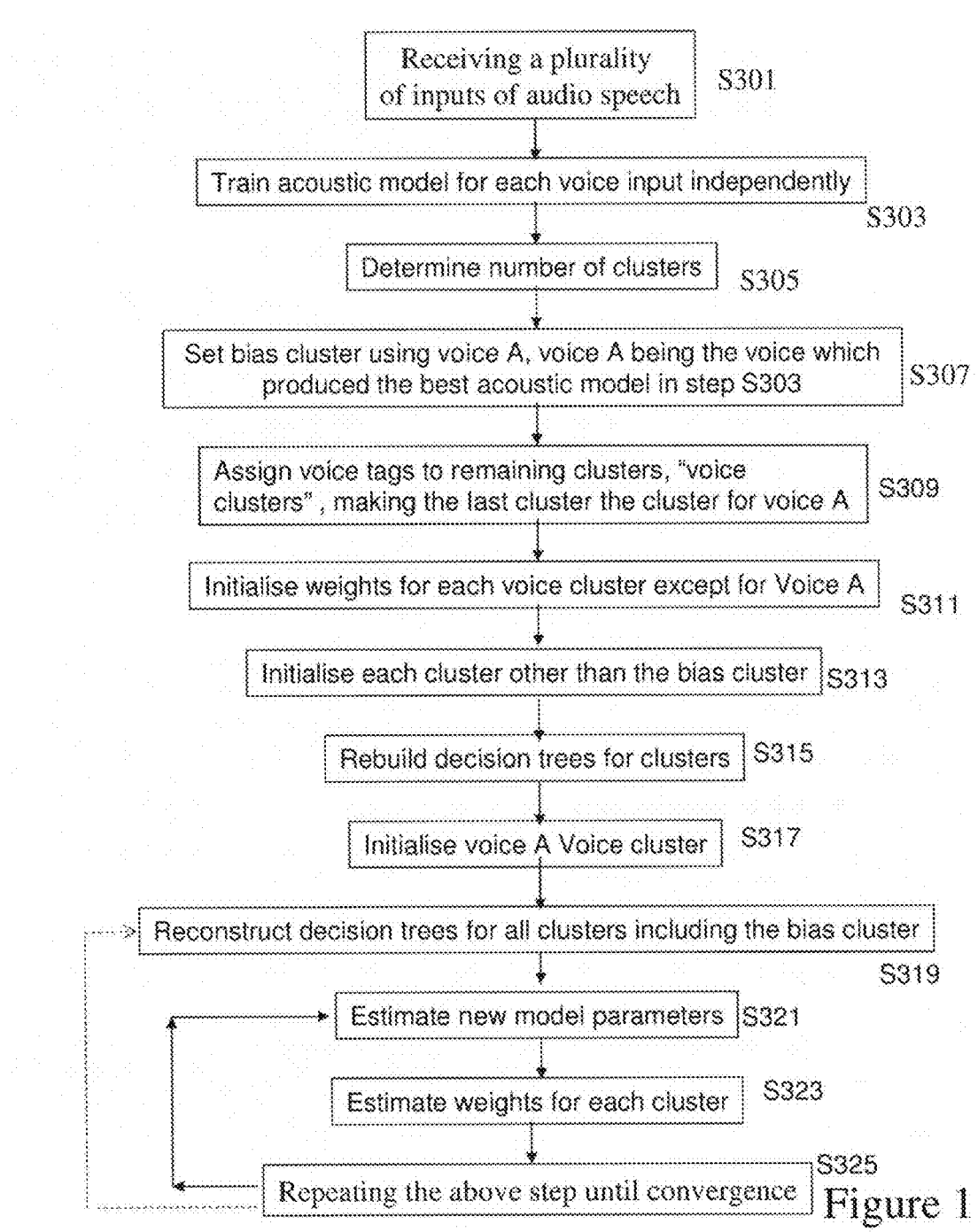
Figure 12:
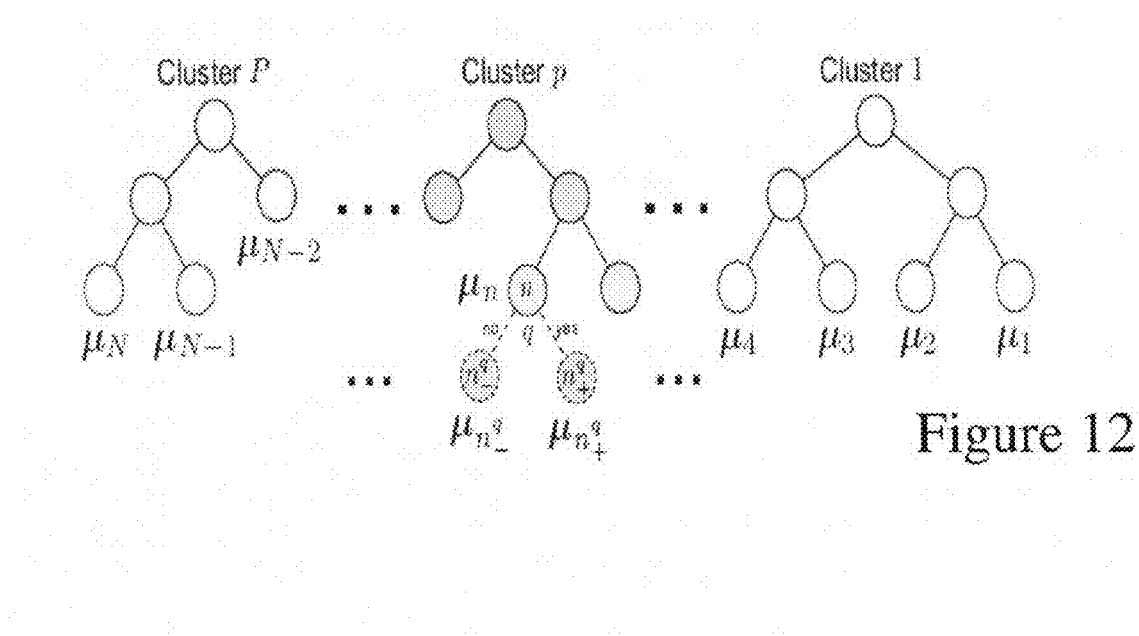
Figure 13:
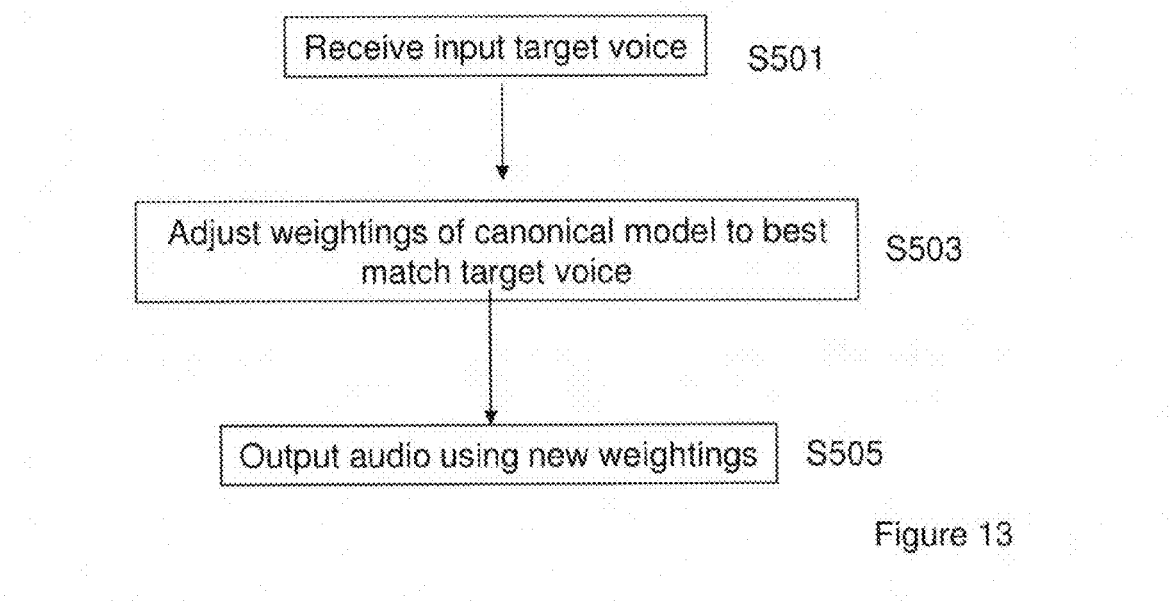
Figure 14:
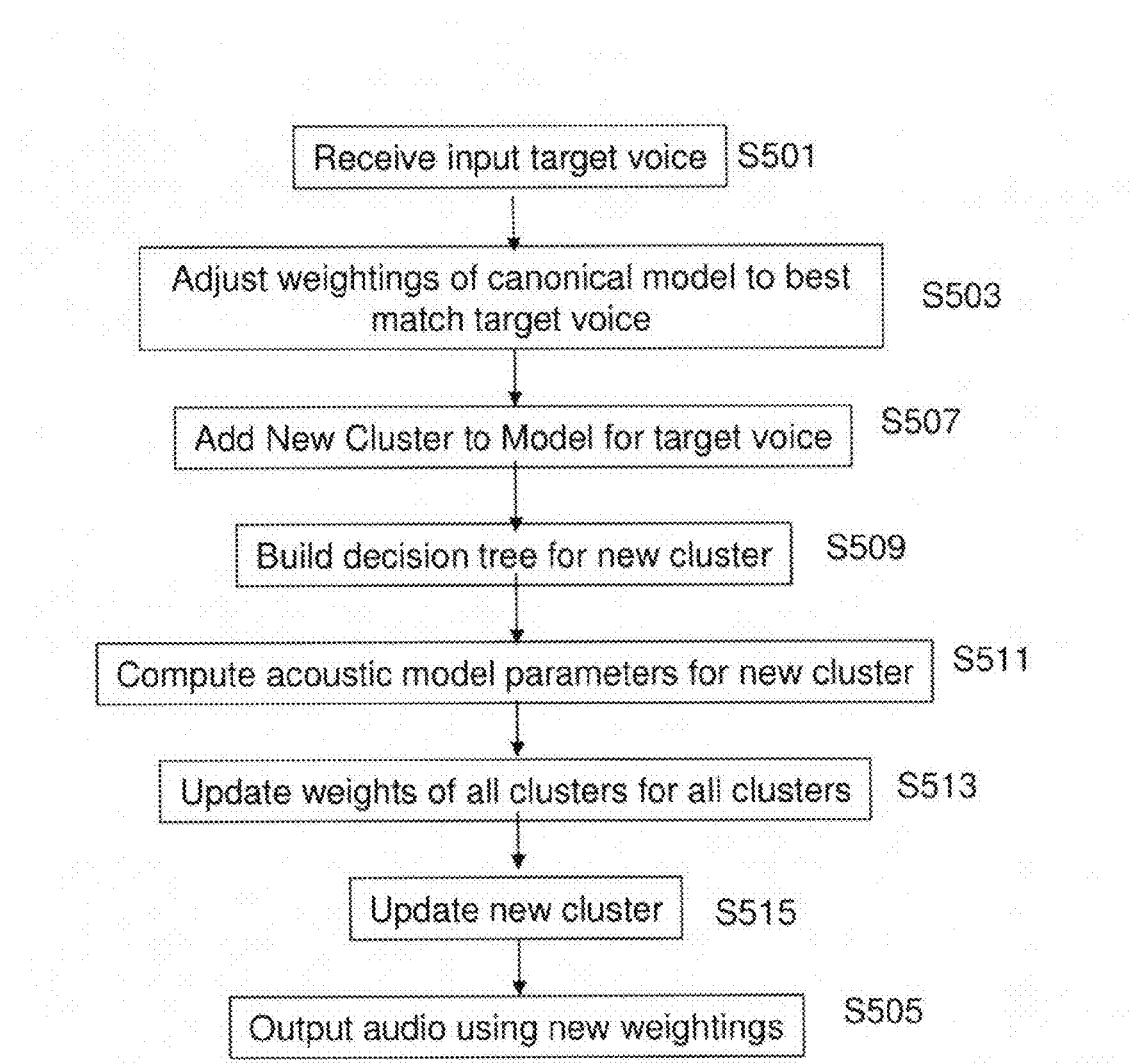

Systems and Methods in accordance with non-limiting embodiments will now be described with reference to the accompanying figures in which:

FIG. 1 is schematic of a text to speech system;
FIG. 2 is a flow diagram showing the steps performed by a known speech processing system;
FIG. 3 is a schematic of a Gaussian probability function;
FIG. 4 is a flow diagram of a speech processing method in accordance with an embodiment of the present invention;
FIG. 5 is a schematic of a system showing how the voice characteristics may be selected;
FIG. 6 is a variation on the system of FIG. 5;
FIG. 7 is a further variation on the system of FIG. 5;
FIG. 8 is a yet further variation on the system of FIG. 5;
FIG. 9a is a flow diagram of a speech processing method in accordance with a further embodiment of the present invention and FIG. 9b is a pictorial representation of some of the steps described with reference to FIG. 9a;
FIG. 10 is schematic of a text to speech system which can be trained;
FIG. 11 is a flow diagram demonstrating a method of training a speech processing system in accordance with an embodiment of the present invention;
FIG. 12 is a schematic of decision trees used by embodiments in accordance with the present invention;
FIG. 13 is a flow diagram showing the adapting of a system in accordance with an embodiment of the present invention; and
FIG. 14 is a flow diagram showing the adapting of a system in accordance with a further embodiment of the present invention

DETAILED DESCRIPTION

In an embodiment, a text-to-speech method for use for simulating a plurality of different voice characteristics,
said method comprising:
inputting text;
dividing said inputted text into a sequence of acoustic units;
selecting voice characteristics for the inputted text;
converting said sequence of acoustic units to a sequence of speech vectors using an acoustic model, wherein said model has a plurality of model parameters describing probability distributions which relate an acoustic unit to a speech vector; and
outputting said sequence of speech vectors as audio with said selected voice characteristics,
wherein a parameter of a predetermined type of each probability distribution in said selected voice characteristics is expressed as a weighted sum of parameters of the same type, and wherein the weighting used is voice characteristic dependent, such that converting said sequence of acoustic units to a sequence of speech vectors comprises retrieving the voice characteristic dependent weights for said selected voice characteristics, wherein the parameters are provided in clusters, and each cluster comprises at least one sub-cluster, wherein said voice characteristic dependent weights are retrieved for each cluster such that there is one weight per sub-cluster.

Each sub-cluster may comprise at least one decision tree, said decision tree being based on questions relating to at least one of linguistic, phonetic or prosodic differences. There may be differences in the structure between the decision trees of the clusters and between trees in the sub-clusters.

The probability distributions may be selected from a Gaussian distribution, Poisson distribution, Gamma distribution, Student-t distribution or Laplacian distribution.

In one embodiment, the plurality of voice characteristics are selected from at least one of different speaker voices, different speaker styles, different speaker emotions or different accents. Selecting a voice characteristic may comprise providing an input to allow the weightings to be selected via the input. Also, selecting a voice characteristic may comprise predicting from the text to be outputted the weightings which should be used. In a yet further embodiment, selecting a voice characteristic may further comprise predicting from external information about the type of speaker, the weightings which should be used.

It is also possible for the method to adapt to a new voice characteristic. For example selecting a voice characteristic may comprise receiving an audio input containing a voice and varying the weightings to simulate the voice characteristics of the voice of the audio input.

In a further embodiment, selecting a voice characteristic comprises randomly selecting a set of weightings from a plurality of pre-stored sets of weightings, wherein each set of weightings comprises the weightings for all sub-clusters.

In a further embodiment selecting a voice characteristic comprises receiving an input, said input comprising a plurality of values and mapping said plurality of values to said weightings. For example, such values could occupy an n-dimensional value space and said weightings occupy a w-dimensional weightings space, where n and w are integers and w is larger than n such that said transform transforms the input values to a higher dimensional space. The values may directly represent recognizable speaker characteristics, such as a happy voice, nervous voice, angry voice etc. The values space can then be thought of as an "emotion space" where either the user or some other indication on the context of the text, indicates where on the emotion space the outputted voice should be and then this is mapped onto the weightings space which will often have a much larger dimension than the "emotion space".

In another embodiment, a method of adapting a text-to-speech system to voice characteristics contained in an audio file is provided, said text-to-speech system comprising:
a processor configured to:
receive a text input;
divide said inputted text into a sequence of acoustic units;
select voice characteristics for the inputted text;
convert said sequence of acoustic units to a sequence of speech vectors using an acoustic model, wherein said model has a plurality of model parameters describing probability distributions which relate an acoustic unit to a speech vector; and
output said sequence of speech vectors as audio with said selected voice characteristics,
wherein a parameter of a predetermined type of each probability distribution in said selected voice characteristics is expressed as a weighted sum of parameters of the same type, and wherein the weighting used is voice characteristic dependent, such that converting said sequence of acoustic units to a sequence of speech vectors comprises retrieving the voice characteristic dependent weights for said selected voice characteristics, wherein the parameters are provided in clusters, and each cluster comprises at least one sub-cluster, wherein said voice characteristic dependent weights are retrieved for each cluster such that there is one weight per sub-cluster,
the method comprising:
receiving a new input audio file;
calculating the weights applied to the clusters to maximize the similarity between the generated speech and the new audio file.

In a further embodiment, a new cluster using the data from the new audio file is created and the weights applied to the clusters including the new cluster are calculated to maximize the similarity between the generated speech and the new audio file.

A speaker transform, for example, CMLLR transform, may be applied in addition to the weightings to more closely match the speech of the new audio file. Such linear transforms may be applied to maximize the similarity between the generated speech and the new audio file. This technique of applying an extra transform may be used both when the adaptation takes place without generating a new speaker cluster and when a new speaker cluster is generated.

In a further embodiment, a text-to-speech system for use for simulating a plurality of different voice characteristics is provided,
said system comprising:
a text input for receiving inputted text;
a processor configured to:
divide said inputted text into a sequence of acoustic units;
allow selection of a voice characteristics for the inputted text;
convert said sequence of acoustic units to a sequence of speech vectors using an acoustic model, wherein said model has a plurality of model parameters describing probability distributions which relate an acoustic unit to a speech vector; and
output said sequence of speech vectors as audio with said selected voice characteristics,
wherein a parameter of a predetermined type of each probability distribution in said selected voice characteristics is expressed as a weighted sum of parameters of the same type, and wherein the weighting used is voice characteristic dependent, such that converting said sequence of acoustic units to a sequence of speech vectors comprises retrieving the voice characteristic dependent weights for said selected voice characteristics, wherein the parameters are provided in clusters, and each cluster comprises at least one sub-cluster, wherein said voice characteristic dependent weights are retrieved for each cluster such that there is one weight per sub-cluster.

In a further embodiment, an adaptable a text-to-speech system is provided which is configured to output speech with voice characteristics provided in an audio file,
said text-to-speech system comprising:
a processor configured to:
receive a text input;
divide said inputted text into a sequence of acoustic units;
select voice characteristics for the inputted text;
convert said sequence of acoustic units to a sequence of speech vectors using an acoustic model, wherein said model has a plurality of model parameters describing probability distributions which relate an acoustic unit to a speech vector; and
output said sequence of speech vectors as audio with said selected voice characteristics,
wherein a parameter of a predetermined type of each probability distribution in said selected voice characteristics is expressed as a weighted sum of parameters of the same type, and wherein the weighting used is voice characteristic dependent, such that converting said sequence of acoustic units to a sequence of speech vectors comprises retrieving the voice characteristic dependent weights for said selected voice characteristics, wherein the parameters are provided in clusters, and each cluster comprises at least one sub-cluster, wherein said voice characteristic dependent weights are retrieved for each cluster such that there is one weight per sub-cluster,
the system further comprising a memory configured to store the said parameters provided in clusters and sub-clusters and the weights for said sub-clusters,
the system being further configured to receive a new input audio file;
the processor being configured to re-calculate the weights applied to the sub-clusters to maximize the similarity between the generated speech and the new audio file.

Methods in accordance with embodiments of the present invention can be implemented either in hardware or on software in a general purpose computer. Further methods in accordance with embodiments of the present can be implemented in a combination of hardware and software. Methods in accordance with embodiments of the present invention can also be implemented by a single processing apparatus or a distributed network of processing apparatuses.

Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

FIG. 1 shows a text to speech system 1. The text to speech system 1 comprises a processor 3 which executes a program 5. Text to speech system 1 further comprises storage 7. The storage 7 stores data which is used by program 5 to convert text to speech. The text to speech system 1 further comprises an input module 11 and an output module 13. The input module 11 is connected to a text input 15. Text input 15 receives text. The text input 15 may be for example a keyboard. Alternatively, text input 15 may be a means for receiving text data from an external storage medium or a network.

Connected to the output module 13 is output for audio 17. The audio output 17 is used for outputting a speech signal converted from text which is input into text input 15. The audio output 17 may be for example a direct audio output e.g. a speaker or an output for an audio data file which may be sent to a storage medium, networked etc.

In use, the text to speech system 1 receives text through text input 15. The program 5 executed on processor 3 converts the text into speech data using data stored in the storage 7. The speech is output via the output module 13 to audio output 17.

A simplified process will now be described with reference to FIG. 2. In first step, S101, text is inputted. The text may be inputted via a keyboard, touch screen, text predictor or the like. The text is then converted into a sequence of acoustic units. These acoustic units may be phonemes or graphemes. The units may be context dependent e.g. triphones which take into account not only the phoneme which has been selected but the proceeding and following phonemes. The text is converted into the sequence of acoustic units using techniques which are well-known in the art and will not be explained further here.

Instead S105, the probability distributions are looked up which relate acoustic units to speech parameters. In this embodiment, the probability distributions will be Gaussian distributions which are defined by means and variances. Although it is possible to use other distributions such as the Poisson, Student-t, Laplacian or Gamma distributions some of which are defined by variables other than the mean and variance.

It is impossible for each acoustic unit to have a definitive one-to-one correspondence to a speech vector or "observation" to use the terminology of the art. Many acoustic units are pronounced in a similar manner, are affected by surrounding acoustic units, their location in a word or sentence, or are pronounced differently by different speakers. Thus, each acoustic unit only has a probability of being related to a speech vector and text-to-speech systems calculate many probabilities and choose the most likely sequence of observations given a sequence of acoustic units.

A Gaussian distribution is shown in FIG. 3 FIG. 3 can be thought of as being the probability distribution of an acoustic unit relating to a speech vector. For example, the speech vector shown as X has a probability P1 of corresponding to the phoneme or other acoustic unit which has the distribution shown in FIG. 3.

The shape and position of the Gaussian is defined by its mean and variance. These parameters are determined during the training of the system.

These parameters are then used in the acoustic model in step S107. In this description, the acoustic model is a Hidden Markov Model (HMM). However, other models could also be used.

The text of the speech system will store many probability density functions relating an to acoustic unit i.e. phoneme, grapheme, word or part thereof to speech parameters. As the Gaussian distribution is generally used, these are generally referred to as Gaussians or components.

In a Hidden Markov Model or other type of acoustic model, the probability of all potential speech vectors relating to a specific acoustic unit must be considered. Then the sequence of speech vectors which most likely corresponds to the sequence of acoustic units will be taken into account. This implies a global optimization over all the acoustic units of the sequence taking into account the way in which two units affect to each other. As a result, it is possible that the most likely speech vector for a specific acoustic unit is not the best speech vector when a sequence of acoustic units is considered.

Once a sequence of speech vectors has been determined, speech is output in step S109.

FIG. 4 is a flowchart of a process for a text to speech system in accordance with an embodiment of the present invention. In step S201, text is received in the same manner as described with reference to FIG. 2. The text is then converted into a sequence of acoustic units which may be phonemes, graphemes, context dependent phonemes or graphemes and words or part thereof in step S203.

The system of FIG. 4 can output speech using a number of different voice characteristics. For example, in an embodiment, characteristics may be selected from a voice sounding, happy, sad, angry, nervous, calm, commanding, etc.

In step S205, the desired voice characteristic is determined. This may be done by a number of different methods. Examples of some possible methods for determining the selected voice characteristic are explained with reference to FIGS. 5 to 8.

In the method which is described with reference to FIG. 4, each Gaussian component is described by a mean and a variance. In some embodiments, there will be a plurality of different states which will be each be modelled using a Gaussian. For example, in an embodiment, the text-to-speech system comprises multiple streams. Such streams may be selected from one or more of spectral parameters (Spectrum), Log of fundamental frequency (Log $F_0$), first differential of Log $F_0$ (Delta Log $F_0$), second differential of Log $F_0$ (Delta-Delta Log $F_0$), Band aperiodicity parameters (BAP), duration etc. The streams may also be further divided into classes such as silence (sil), short pause (pau) and speech (spe) etc. In an embodiment, the data from each of the streams and classes will be modelled using a HMM. The HMM may comprise different numbers of states, for example, in an embodiment, 5 state HMMs may be used to model the data from some of the above streams and classes. A Gaussian component is determined for each HMM state.

In the system of FIG. 4, the mean of a Gaussian with a selected voice characteristic is expressed as a weighted sum of independent means of the Gaussians. Thus:

$$\mu_m^{(s)} = \sum_i \lambda_i^{(s)} \mu_{c(m,i)} \qquad \text{Eqn. 1}$$

where $\mu_m^{(s)}$ is the mean of component m in with a selected speaker voice s, $i \in \{1, \ldots, P\}$ is the index for a cluster with P the total number of clusters, $\lambda_i^{(s)}$ is the speaker dependent interpolation weight of the $i^{th}$ cluster for the speaker s; $\mu_{c(m,i)}$ is the mean for component m in cluster i. For one of the clusters, usually cluster i=1, all the weights are always set to 1.0. This cluster is called the 'bias cluster'. Each cluster comprises at least one decision tree. There will be a decision tree for each component in the cluster. In order to simplify the expression, $c(m,i) \in \{1, \ldots, N\}$ indicates the general leaf node index for the component m in the mean vectors decision tree for cluster $i^{th}$, with N the total number of leaf nodes across the decision trees of all the clusters. The details of the decision trees will be explained later In step S207, the system looks up the means and variances which will be stored in an accessible manner.

In step S209, the system looks up the voice characteristic dependent weightings for the means. It will be appreciated by those skilled in the art that the voice characteristic dependent weightings may be looked up before or after the means are looked up.

Thus, after step S209, it is possible to obtain voice characteristic dependent means i.e. using the means and applying the weightings, these are then used in an acoustic model in step S211 in the same way as described with reference to step S107 in FIG. 2. The speech is then output in step S213.

The voice characteristic independent means are clustered. In an embodiment, each cluster comprises at least one decision tree, the decisions used in said trees are based on linguistic, phonetic and prosodic variations. In an embodiment, there is a decision tree for each component which is a member of a cluster. Prosodic, phonetic, and linguistic contexts affect the final speech waveform. Phonetic contexts typically affects vocal tract, and prosodic (e.g. syllable) and linguistic (e.g., part of speech of words) contexts affects prosody such as duration (rhythm) and fundamental frequency (tone). Each cluster may comprise one or more sub-clusters where each sub-cluster comprises at least one of the said decision trees.

The above can either be considered to retrieve a weight for each sub-cluster or a weight vector for each cluster, the components of the weight vector being the weightings for each sub-cluster.

The following configuration may be used in accordance with an embodiment of the present invention. To model this data, in this embodiment, 5 state HMMs are used. The data is separated into three classes for this example: silence, short pause, and speech. In this particular embodiment, the allocation of decision trees and weights per sub-cluster are as follows.

In this particular embodiment the following streams are used per cluster:
Spectrum: 1 stream, 5 states, 1 tree per state×3 classes
LogF0: 3 streams, 5 states per stream, 1 tree per state and stream×3 classes
BAP: 1 stream, 5 states, 1 tree per state×3 classes
Duration: 1 stream, 5 states, 1 tree×3 classes (each tree is shared across all states)
Total: 3×26=78 decision trees For the above, the following weights are applied to each stream per voice characteristic e.g. speaker:
Spectrum: 1 stream, 5 states, 1 weight per stream×3 classes
LogF0: 3 streams, 5 states per stream, 1 weight per stream×3 classes
BAP: 1 stream, 5 states, 1 weight per stream×3 classes
Duration: 1 stream, 5 states, 1 weight per state and stream×3 classes
Total: 3×10=30 weights As shown in this example, it is possible to allocate the same weight to different decision trees (spectrum) or more than one weight to the same decision tree (duration) or any other combination. As used herein, decision trees to which the same weighting is to be applied are considered to form a sub-cluster.

In an embodiment, the mean of a Gaussian distribution with a selected voice characteristic is expressed as a weighted sum of the means of a Gaussian component, where the summation uses one mean from each cluster, the mean being selected on the basis of the prosodic, linguistic and phonetic context of the acoustic unit which is currently being processed.

FIG. 5 shows a possible method of selecting the voice characteristics. Here, a user directly selects the weighting using, for example, a mouse to drag and drop a point on the screen, a keyboard to input a figure etc. In FIG. 5, a selection unit 251 which comprises a mouse, keyboard or the like selects the weightings using display 253. Display 253, in this example has a radar chart which shows the weightings. The user can use the selecting unit 251 in order to change the dominance of the various clusters via the radar chart. It will be appreciated by those skilled in the art that other display methods may be used.

In some embodiments, the weighting can be projected onto their own space, a "weights space" with initially a weight representing each dimension. This space can be re-arranged into a different space which dimensions represent different voice attributes. For example, if the modelled voice characteristic is expression, one dimension may indicate happy voice characteristics, another nervous etc, the user may select to increase the weighting on the happy voice dimension so that this voice characteristic dominates. In that case the number of dimensions of the new space is lower than that of the original weights space. The weights vector on the original space $\lambda^{(s)}$ can then be obtained as a function of the coordinates vector of the new space $\alpha^{(s)}$.

In one embodiment, this projection of the original weight space onto a reduced dimension weight space is formed using a linear equation of the type $\lambda^{(s)}=H\alpha^{(s)}$ where H is a projection matrix. In one embodiment, matrix H is defined to set on its columns the original $\lambda^{(s)}$ for d representative speakers selected manually, where d is the desired dimension of the new space. Other techniques could be used to either reduce the dimensionality of the weight space or, if the values of $\alpha^{(s)}$ are pre-defined for several speakers, to automatically find the function that maps the control $\alpha$ space to the original $\lambda$ weight space.

In a further embodiment, the system is provided with a memory which saves predetermined sets of weightings vectors. Each vector may be designed to allow the text to be outputting with a different voice characteristic. For example, a happy voice, furious voice, etc. A system in accordance with such an embodiment is shown in FIG. 6. Here, the display 253 shows different voice attributes which may be selected by selecting unit 251.

The system may indicate a set of choices of speaker output based on the attributes of the predetermined sets. The user may then select the speaker required.

In a further embodiment, as shown in FIG. 7, the system determines the weightings automatically. For example, the system may need to output speech corresponding to text which it recognises as being a command or a question. The system may be configured to output an electronic book. The system may recognise from the text when something is being spoken by a character in the book as opposed to the narrator, for example from quotation marks, and change the weighting to introduce a new voice characteristic to the output. Similarly, the system may be configured to recognise if the text is repeated. In such a situation, the voice characteristics may change for the second output. Further the system may be configured to recognise if the text refers to a happy moment, or an anxious moment and the text outputted with the appropriate voice characteristics.

In the above system, a memory 261 is provided which stores the attributes and rules to be checked in the text. The input text is provided by unit 263 to memory 261. The rules for the text are checked and information concerning the type of voice characteristics are then passed to selector unit 265. Selection unit 265 then looks up the weightings for the selected voice characteristics.

The above system and considerations may also be applied for the system to be used in a computer game where a character in the game speaks.

In a further embodiment, the system receives information about the text to be outputted from a further source. An example of such a system is shown in FIG. 8. For example, in the case of an electronic book, the system may receive inputs indicating how certain parts of the text should be outputted.

In a computer game, the system will be able to determine from the game whether a character who is speaking has been injured, is hiding so has to whisper, is trying to attract the attention of someone, has successfully completed a stage of the game etc.

In the system of FIG. 8, the further information on how the text should be outputted is received from unit 271. Unit 271 then sends this information to memory 273. Memory 273 then retrieves information concerning how the voice should be output and send this to unit 275. Unit 275 then retrieves the weightings for the desired voice output.

In addition to the above, the method further implements a voice transform by using a MLLR, CMLLR transform or the like. Specifically when the modelled voice characteristic is speaker variability, this extra transform adds extra modelling power which is in addition to any speaker variation provided by the weightings of the clusters. The process to use this extra transform is described in FIGS. 9a and b.

In FIG. 9a, in step S206, a speaker voice is selected. The speaker voice will be selected from a plurality of pre-stored speaker profiles which can be implemented through known speaker transforms. The selected speaker profile can be determined during the initial set up of the system and not every time the system is used.

The system will then retrieve the model parameters in S207 and the speaker weightings as required in step S209 as previously explained.

When the system knows the desired speaker, the system can look up the additional speaker transforms in step S210. Then, the speaker dependent weights and transforms are applied together in step S211. A set of speech vectors is determined in step S212 and the speech is output in step S213 as previously described. In this embodiment, the transforms are applied to the model before the generation of the speech vectors.

FIG. 9b is a schematic of the process described with reference to FIG. 9a. In step S209, of FIG. 9a, the speaker weightings are looked. These weightings are applied to the decision trees 401 of FIG. 9b. The weighted mean from each decision tree is summed in at 403. In 405, the speaker transforms (if used) are applied and the final speaker model is outputted at 407.

Next, the training of a system in accordance with an embodiment of the present invention will be described with reference to FIGS. 10 and 11.

The system of FIG. 10 is similar to that described with reference to FIG. 1. Therefore, to avoid any unnecessary repetition, like reference numerals will be used to denote like features.

In addition to the features described with reference to FIG. 1, FIG. 10 also comprises an audio input 23 and an audio input module 21. When training a system, it is necessary to have an audio input which matches the text being inputted via text input 15.

In speech processing systems which are based on Hidden Markov Models (HMMs), the HMM is often expressed as:

$$M = (A, B, \Pi) \qquad \text{Eqn. 2}$$

where $A = \{a_{ij}\}_{i,j=1}^{N}$ and is the state transition probability distribution, $B = \{b_j(o)\}_{j=1}^{N}$ is the state output probability distribution and $\Pi = \{\pi_i\}_{i=1}^{N}$ is the initial state probability distribution and where N is the number of states in the HMM.

How a HMM is used in a text-to-speech system is well known in the art and will not be described here.

In the current embodiment, the state transition probability distribution A and the initial state probability distribution are determined in accordance with procedures well known in the art. Therefore, the remainder of this description will be concerned with the state output probability distribution.

Generally in text to speech systems the state output vector or speech vector o(t) from an $m^{th}$ Gaussian component in a model set $\mathcal{M}$ is $$P(o(t) | m, s, \mathcal{M}) = N(o(t); \mu_m^{(s)}, \Sigma_m^{(s)}) \qquad \text{Eqn. 3}$$

where $\mu_m^{(s)}$ and $\Sigma_m^{(s)}$ are the mean and covariance of the $m^{th}$ Gaussian component for speaker s.

The aim when training a conventional text-to-speech system is to estimate the Model parameter set $\mathcal{M}$ which maximizes likelihood for a given observation sequence. In the conventional model, there is one single speaker, therefore the model parameter set is $\mu_m^{(s)} = \mu_m$ and $\Sigma_m^{(s)} = \Sigma_m$ for the all components m.

As it is not possible to obtain the above model set based on so called Maximum Likelihood (ML) criteria purely analytically, the problem is conventionally addressed by using an iterative approach known as the expectation maximisation (EM) algorithm which is often referred to as the Baum-Welch algorithm. Here, an auxiliary function (the "Q" function) is derived:

$$Q(\mathcal{M}, \mathcal{M}') = \sum_{m,t} \gamma_m(t) \log p(o(t), m | \mathcal{M}) \qquad \text{Eqn 4}$$

where $\gamma_m(t)$ is the posterior probability of component m generating the observation o(t) given the current model parameters M' and $\mathcal{M}$ is the new parameter set. After each iteration, the parameter set $\mathcal{M}'$ is replaced by the new parameter set $\mathcal{M}$ which maximizes $Q(\mathcal{M}, \mathcal{M}')$. $p(o(t), m | \mathcal{M})$ is a generative model such as a GMM, HMM etc.

In the present embodiment a HMM is used which has a state output vector of:

$$P(o(t) | m, s, \mathcal{M}) = N(o(t); \hat{\mu}_m^{(s)}, \hat{\Sigma}_{v(m)}^{(s)}) \qquad \text{Eqn. 5}$$

Where $m \in \{1, \ldots, MN\}$, $t \in \{1, \ldots, T\}$ and $s \in \{1, \ldots, S\}$ are indices for component, time and speaker respectively and where MN, T, and S are the total number of components, frames, and speakers respectively.

The exact form of $\hat{\mu}_m^{(s)}$ and $\hat{\Sigma}_m^{(s)}$ depends on the type of speaker dependent transforms that are applied. In the most general way the speaker dependent transforms includes:
- a set of speaker dependent weights $\lambda_{q(m)}^{(s)}$
- a speaker-dependent cluster $\mu_{c(m,x)}^{(s)}$
- a set of linear transforms $[A_{r(m)}^{(s)}, b_{r(m)}^{(s)}]$ After applying all the possible speaker dependent transforms in step 211, the mean vector $\hat{\mu}_m^{(s)}$ and covariance matrix $\hat{\Sigma}_m^{(s)}$ of the probability distribution m for speaker s become $$\hat{\mu}_m^{(s)} = A_{r(m)}^{(s)-1}\left(\sum_i \lambda_i^{(s)} \mu_{c(m,i)} + (\mu_{c(m,x)}^{(s)} - b_{r(m)}^{(s)})\right) \quad \text{Eqn 6}$$

$$\hat{\Sigma}_m^{(s)} = \left(A_{r(m)}^{(s)T} \sum_{v(m)}^{-1} A_{r(m)}^{(s)}\right)^{-1} \quad \text{Eqn. 7}$$

where $\mu_{c(m,i)}$ are the means of cluster I for component m as described in Eqn. 1, $\mu_{c(m,x)}^{(s)}$ is the mean vector for component m of the additional cluster for speaker s, which will be described later, and $A_{r(m)}^{(s)}$ and $b_{r(m)}^{(s)}$ are the linear transformation matrix and the bias vector associated with regression class r(m) for the speaker s.

R is the total number of regression classes and $r(m)\epsilon\{1, \ldots, R\}$ denotes the regression class to which the component m belongs.

If no linear transformation is applied $A_{r(m)}^{(s)}$ and $b_{r(m)}^{(s)}$ become an identity matrix and zero vector respectively.

For reasons which will be explained later, in this embodiment, the covariances are clustered and arranged into decision trees where $v(m)\epsilon\{1, \ldots, V\}$ denotes the leaf node in a covariance decision tree to which the co-variance matrix of the component m belongs and V is the total number of variance decision tree leaf nodes.

Using the above, the auxiliary function can be expressed as:

$$Q(M, M') = \quad \text{Eqn 8}$$
$$-\frac{1}{2}\sum_{m,t,s} \gamma_m(t) \left\{\log\left|\hat{\Sigma}_{v(m)}\right| + (o(t) - \hat{\mu}_m^{(s)})^T \hat{\Sigma}_{v(m)}^{-1}(o(t) - \hat{\mu}_m^{(s)})\right\} + C$$

where C is a constant independent of $\mathcal{M}$

Thus, using the above and substituting equations 6 and 7 in equation 8, the auxiliary function shows that the model parameters may be split into four distinct parts.

The first part are the parameters of the canonical model i.e. speaker independent means $\{\mu_n\}$ and the speaker independent covariance $\{\Sigma_k\}$ the above indices n and k indicate leaf nodes of the mean and variance decision trees which will be described later. The second part are the speaker dependent weights $\{\lambda_i^{(s)}\}_{s,i}$ where s indicates speaker and i the cluster index parameter. The third part are the means of the speaker dependent cluster $\mu_{c(m,x)}$ and the fourth part are the CMLLR constrained maximum likelihood linear regression. transforms $\{A_d^{(s)}, b_d^{(s)}\}_{s,d}$ where s indicates speaker and d indicates component or speaker regression class to which component m belongs.

Once the auxiliary function is expressed in the above manner, it is then maximized with respect to each of the variables in turn in order to obtain the ML values of the speaker and voice characteristic parameters, the speaker dependent parameters and the voice characteristic dependent parameters.

In detail, for determining the ML estimate of the mean, the following procedure is performed.

To simplify the following equations it is assumed that no linear transform is applied. If a linear transform is applied, the original observation vectors $\{o_r(t)\}$ have to be substituted by the transformed vectors $$\{\tilde{o}_{r(m)}^{(s)}(t) = A_{r(m)}^{(s)} o(t) + b_{r(m)}^{(s)}\} \quad \text{Eqn. 9}$$

Similarly, it will be assumed that there is no additional cluster. The inclusion of that extra cluster during the training is just equivalent to adding a linear transform on which $A_{r(m)}^{(s)}$ is the identity matrix and $\{b_{r(m)}^{(s)} = \mu_{c(m,x)}^{(s)}\}$ First, the auxiliary function of equation 4 is differentiated with respect to $\mu_n$ as follows:

$$\frac{\partial \mathcal{Q}(M;\hat{M})}{\partial \mu_n} = k_n - G_{nn}\mu_n - \sum_{v \neq n} G_{nv}\mu_v \quad \text{Eqn. 10}$$

Where $$G_{nv} = \sum_{\substack{m,i,j \\ c(m,i)=n \\ c(m,j)=v}} G_{ij}^{(m)}, \quad \text{Eqn. 11}$$

$$k_n = \sum_{\substack{m,i \\ c(m,i)=n}} k_i^{(m)}.$$

with $G_{ij}^{(m)}$ and $k_i^{(m)}$ accumulated statistics $$G_{ij}^{(m)} = \sum_{t,s} \gamma_m(t,s) \lambda_{i,q(m)}^{(s)} \sum_{v(m)}^{-1} \lambda_{j,q(m)}^{(s)} \quad \text{Eqn. 12}$$

$$k_i^{(m)} = \sum_{t,s} \gamma_m(t,s) \lambda_{i,q(m)}^{(s)} \sum_{v(m)}^{-1} o(t).$$

By maximizing the equation in the normal way by setting the derivative to zero, the following formula is achieved for the ML estimate of $\mu_n$ i.e. $\hat{\mu}_n$:

$$\hat{\mu}_n = G_{nn}^{-1}\left(k_n - \sum_{v \neq n} G_{nv}\mu_v\right) \quad \text{Eqn. 13}$$

It should be noted, that the ML estimate of $\mu_n$ also depends on $\mu_k$ where k does not equal n. The index n is used to represent leaf nodes of decisions trees of mean vectors, whereas the index k represents leaf modes of covariance decision trees. Therefore, it is necessary to perform the optimization by iterating over all $\mu_n$ until convergence.

This can be performed by optimizing all $\mu_n$ simultaneously by solving the following equations.

$$\begin{bmatrix} G_{11} & \cdots & G_{1N} \\ \vdots & \ddots & \vdots \\ G_{N1} & \cdots & G_{NN} \end{bmatrix} \begin{bmatrix} \hat{\mu}_1 \\ \vdots \\ \hat{\mu}_N \end{bmatrix} = \begin{bmatrix} k_1 \\ \vdots \\ k_N \end{bmatrix}, \quad \text{Eqn. 14}$$

However, if the training data is small or N is quite large, the coefficient matrix of equation 7 cannot have full rank. This problem can be avoided by using singular value decomposition or other well-known matrix factorization techniques.

The same process is then performed in order to perform an ML estimate of the covariances i.e. the auxiliary function shown in equation (8) is differentiated with respect to $\Sigma_k$ to give:

$$\hat{\sum}_k = \frac{\sum_{\substack{t,s,m \\ v(m)=k}} \gamma_m(t,s)\bar{o}(t)\bar{o}(t)^\top}{\sum_{\substack{t,s,m \\ v(m)=k}} \gamma_m(t,s)} \quad \text{Eqn. 15}$$

Where $$\bar{o}(t) = o(t) - \mu_m^{(s)} \quad \text{Eqn. 16}$$

The ML estimate for speaker dependent weights and the speaker dependent linear transform can also be obtained in the same manner i.e. differentiating the auxiliary function with respect to the parameter for which the ML estimate is required and then setting the value of the differential to 0.

For the speaker dependent weights this yields $$\lambda_q^{(s)} = \left(\sum_{\substack{t,m \\ q(m)=q}} \gamma_m(t,s) M_m^\top \hat{\sum}^{-1} M_m\right)^{-1} \sum_{\substack{t,m \\ q(m)=q}} \gamma_m(t,s) M_m^\top \hat{\sum}^{-1} o(t) \quad \text{Eqn. 17}$$

In a preferred embodiment, the process is performed in an iterative manner. This basic system is explained with reference to the flow diagram of FIG. 11.

In step S301, a plurality of inputs of audio speech are received. In this illustrative example, 4 speakers are used.

Next, in step S303, an acoustic model is trained and produced for each of the 4 voices. In this embodiment, each of the 4 models is only trained using data from one voice.

A cluster adaptive model is initialised and trained as follows:

In step S305, the number of clusters P is set to V+1, where V is the number of voices (4).

In step S307, one cluster (cluster 1), is determined as the bias cluster. The decision trees for the bias cluster and the associated cluster mean vectors are initialised using the voice which in step S303 produced the best model. In this example, each voice is given a tag "Voice A", "Voice B", "Voice C" and "Voice D", here Voice A is assumed to have produced the best model. The covariance matrices, space weights for multi-space probability distributions (MSD) and their parameter sharing structure are also initialised to those of the voice A model.

Each binary decision tree is constructed in a locally optimal fashion starting with a single root node representing all contexts. In this embodiment, by context, the following bases are used, phonetic, linguistic and prosodic. As each node is created, the next optimal question about the context is selected. The question is selected on the basis of which question causes the maximum increase in likelihood and the terminal nodes generated in the training examples.

Then, the set of terminal nodes is searched to find the one which can be split using its optimum question to provide the largest increase in the total likelihood to the training data. Providing that this increase exceeds a threshold, the node is divided using the optimal question and two new terminal nodes are created. The process stops when no new terminal nodes can be formed since any further splitting will not exceed the threshold applied to the likelihood split.

This process is shown for example in FIG. 12. The nth terminal node in a mean decision tree is divided into two new terminal nodes $n_+^q$ and $n_-^q$ by a question q. The likelihood gain achieved by this split can be calculated as follows:

$$\mathcal{L}(n) = -\frac{1}{2}\mu_n^\top \left(\sum_{m \in S(n)} G_{ii}^{(m)}\right)\mu_n + \mu_n^\top \left(\sum_{m \in S(n)} G_{ii}^{(m)}\right)\mu_n + \mu_n^\top \sum_{m \in S(n)} \left(k_i^{(m)} - \sum_{j \neq i} G_{ij}^{(m)} \mu_{c(m,j)}\right) \quad \text{Eqn. 18}$$

Where S(n) denotes a set of components associated with node n. Note that the terms which are constant with respect to $\mu_n$ are not included.

Where C is a constant term independent of $\mu_n$. The maximum likelihood of $\mu_n$ is given by equation 13 Thus, the above can be written as:

$$\mathcal{L}(n) = \frac{1}{2}\hat{\mu}_n^\top \left(\sum_{m \in S(n)} G_{ii}^{(m)}\right)\hat{\mu}_n \quad \text{Eqn. 19}$$

Thus, the likelihood gained by splitting node n into $n_+^q$ and $n_-^q$ is given by:

$$\Delta\mathcal{L}(n;q) = \mathcal{L}(n_+^q) + \mathcal{L}(n_-^q) - \mathcal{L}(n) \quad \text{Eqn. 20}$$

Thus, using the above, it is possible to construct a decision tree for each cluster where the tree is arranged so that the optimal question is asked first in the tree and the decisions are arranged in hierarchical order according to the likelihood of splitting. A weighting is then applied to each cluster.

Decision trees might be also constructed for variance. The covariance decision trees are constructed as follows: If the case terminal node in a covariance decision tree is divided into two new terminal nodes $k_+^q$ and $k_-^q$ by question q, the cluster covariance matrix and the gain by the split are expressed as follows:

$$\sum_k = \frac{\sum_{\substack{m,t,s \\ v(m)=k}} \gamma_m(t) \sum_{v(m)}}{\sum_{\substack{m,t,s \\ v(m)=k}} \gamma_m(t)} \quad \text{Eqn. 21}$$

$$\mathcal{L}(k) = -\frac{1}{2}\sum_{\substack{m,t,s \\ v(m)=k}} \gamma_m(t) \log\left|\sum_k\right| + D \quad \text{Eqn. 22}$$

where D is constant independent of $\{\Sigma_k\}$. Therefore the increment in likelihood is $$\Delta\mathcal{L}(k,q) = \mathcal{L}(k_+^q) + \mathcal{L}(k_-^q) - \mathcal{L}(k) \quad \text{Eqn. 23}$$

In step S309, a specific voice tag is assigned to each of 2, . . . , P clusters e.g. clusters 2, 3, 4, and 5 are for speakers B, C, D and A respectively. Note, because voice A was used to initialise the bias cluster it is assigned to the last cluster to be initialised.

In step S311, a set of CAT interpolation weights are simply set to 1 or 0 according to the assigned voice tag as:

$$\lambda_i^{(s)} = \begin{cases} 1.0 & \text{if } i = 0 \\ 1.0 & \text{if voicetag}(s) = i \\ 0.0 & \text{otherwise} \end{cases}$$

In this embodiment, there are global weights per speaker, per stream. For each speaker/stream combination 3 sets of weights are set: for silence, speech and pause.

In step S313, for each cluster 2, . . . , (P−1) in turn the clusters are initialised as follows. The voice data for the associated voice, e.g. voice B for cluster 2, is aligned using the mono-speaker model for the associated voice trained in step S303. Given these alignments, the statistics are computed and the decision tree and mean values for the cluster are estimated. The mean values for the cluster are computed as the normalised weighted sum of the cluster means using the weights set in step S311 i.e. in practice this results in the mean values for a given context being the weighted sum (weight 1 in both cases) of the bias cluster mean for that context and the voice B model mean for that context in cluster 2.

In step S315, the decision trees are then rebuilt for the bias cluster using all the data from all 4 voices, and associated means and variance parameters re-estimated.

After adding the clusters for voices B, C and D the bias cluster is re-estimated using all 4 voices at the same time.

In step S317, Cluster P (voice A) is now initialised as for the other clusters, described in step S313, using data only from voice A.

Once the clusters have been initialised as above, the CAT model is then updated/trained as follows.

In step S319 the decision trees are re-constructed cluster-by-cluster from cluster 1 to P, keeping the CAT weights fixed. In step S321, new means and variances are estimated in the CAT model. Next in step S323, new CAT weights are estimated for each cluster. In an embodiment, the process loops back to S321 until convergence. The parameters and weights are estimated using maximum likelihood calculations performed by using the auxiliary function of the Baum-Welch algorithm to obtain a better estimate of said parameters.

As previously described, the parameters are estimated via an iterative process.

In a further embodiment, at step S323, the process loops back to step S319 so that the decision trees are reconstructed during each iteration until convergence.

In a further embodiment, speaker dependent transforms as previously described are used. Here, the speaker dependent transforms are inserted after step S323 such that the transforms are applied and the transformed model is then iterated until convergence. In an embodiment, the transforms would be updated on each iteration.

FIG. 12 shows clusters 1 to P which are in the forms of decision trees. In this simplified example, there are just four terminal nodes in cluster 1 and three terminal nodes in cluster P. It is important to note that the decision trees need not be symmetric i.e. each decision tree can have a different number of terminal nodes. The number of terminal nodes and the number of branches in the tree is determined purely by the log likelihood splitting which achieves the maximum split at the first decision and then the questions are asked in order of the question which causes the larger split. Once the split achieved is below a threshold, the splitting of a node terminates.

The above produces a canonical model which allows the following synthesis to be performed:
1. Any of the 4 voices can be synthesised using the final set of weight vectors corresponding to that voice
2. A random voice can be synthesised from the acoustic space spanned by the CAT model by setting the weight vectors to arbitrary positions.

In a further example, the assistant is used to synthesise a voice characteristic where the system is given an input of a target voice with the same characteristic.

FIG. 13 shows one example. First, the input target voice is received at step 501. Next, the weightings of the canonical model i.e. the weightings of the clusters which have been previously trained, are adjusted to match the target voice in step 503.

The audio is then outputted using the new weightings derived in step S503.

In a further embodiment, a more complex method is used where a new cluster is provided for the new voice. This will be described with reference to FIG. 14.

As in FIG. 13, first, the target voice is received in step S501. The weightings are then adjusted to best match the target voice in step S503.

Then, a new cluster is added to the model for the target voice in step S507. Next, the decision tree is built for the new speaker dependent cluster in the same manner as described with reference to FIG. 11.

Then, acoustic model parameters i.e. in this example, the means are computed for the new cluster in step S511.

Next, in step S513, the weights are updated for all clusters. Then, in step S515, the structure of the new cluster is updated.

As before, the audio with the new target voice is outputted using the new weightings with the new cluster in step S505.

Note, that in this embodiment, in step S515, the other clusters are not updated at this time as this would require the training data to be available at synthesis time.

In a further embodiment the clusters are updated after step S515 and thus the flow diagram loops back to step S509 until convergence.

Finally, a linear transform such as CMLLR can be applied on top of the model to further improve the similarity to the target speaker. The regression classes of this transform can be global or be speaker dependent.

In the second case the tying structure of the regression classes can be derived from the decision tree of the speaker dependent cluster or from a clustering of the distributions obtained after applying the speaker dependent weights to the canonical model and adding the extra cluster.

At the start, the bias cluster represents speaker/voice-independent characteristics, whereas the other clusters represent their associated voice data set. As the training progresses the precise assignment of cluster to voice becomes less precise. The clusters and CAT weights now represent a broad acoustic space.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. A text-to-speech method for use for simulating a plurality of different voice characteristics,
said method comprising:
inputting text;
dividing said inputted text into a sequence of acoustic units;

selecting voice characteristics for the inputted text; converting said sequence of acoustic units to a sequence of speech vectors using an acoustic model, wherein said model has a plurality of model parameters describing probability distributions which relate an acoustic unit to a speech vector; and outputting said sequence of speech vectors as audio with said selected voice characteristics, wherein a parameter of a predetermined type of each probability distribution in said selected voice characteristics is expressed as a weighted sum of parameters of the same type, and wherein the weighting used is voice characteristic dependent, such that converting said sequence of acoustic units to a sequence of speech vectors comprises retrieving the voice characteristic dependent weights for said selected voice characteristics, wherein the parameters are provided in clusters, and each cluster comprises at least one sub-cluster, wherein said voice characteristic dependent weights are retrieved for each cluster such that there is one weight per sub-cluster.

2. The text-to-speech method according to claim 1, wherein each sub-cluster comprises at least one decision tree, said decision tree being based on questions relating to at least one of linguistic, phonetic or prosodic differences.

3. The text-to-speech system according to claim 2, wherein there are differences in the structure between the decision trees of the clusters.

4. The text-to-speech method according to claim 1, wherein said selecting voice characteristics comprises selecting the plurality of voice characteristics from at least one of different speaker voices, different speaker styles, different speaker emotions or different accents.

5. The text-to-speech method according to claim 1, wherein the probability distributions are selected from a Gaussian distribution, Poisson distribution, Gamma distribution, Student-t distribution or Laplacian distribution.

6. The text-to-speech method according to claim 1, wherein selecting the voice characteristic comprises providing an input to allow the weightings to be selected via the input.

7. The text-to-speech method according to claim 1, wherein said selecting the voice characteristic comprises predicting from the text to be outputted the weightings which should be used.

8. The text-to-speech method according to claim 1, wherein said selecting the voice characteristic comprises predicting from external information about the type of speaker, the weightings which should be used.

9. The text-to-speech method according to claim 1, wherein said selecting the voice characteristic comprises receiving an audio input containing a voice and varying the weightings to simulate the voice characteristics of the voice of the audio input.

10. The text-to-speech method according to claim 1, wherein said selecting the voice characteristic comprises randomly selecting a set of weightings from a plurality of pre-stored sets of weightings, wherein each set of weightings comprises the weightings for all sub-clusters.

11. The text to speech method according to claim 1, wherein
said selecting the voice characteristic comprises receiving an input, said input comprising a plurality of values and mapping said plurality of values to said weightings.

12. The text to speech method according to claim 11, wherein said values occupy an n-dimensional value space and said weightings occupy a w-dimensional weightings space, where n and w are integers and w is larger than n such that a mapping transform that maps the input values to the weightings transforms the input values to a higher dimensional space.

13. The method according to claim 12, wherein the plurality of values directly represent recognizable speaker characteristics.

14. A method of adapting a text-to-speech system to voice characteristics provided in an audio file,
said text-to-speech system comprising:
a processor configured to:
receive a text input;
divide said inputted text into a sequence of acoustic units;
select voice characteristics for the inputted text;
convert said sequence of acoustic units to a sequence of speech vectors using an acoustic model, wherein said model has a plurality of model parameters describing probability distributions which relate an acoustic unit to a speech vector; and
output said sequence of speech vectors as audio with said selected voice characteristics,
wherein a parameter of a predetermined type of each probability distribution in said selected voice characteristics is expressed as a weighted sum of parameters of the same type, and wherein the weighting used is voice characteristic dependent, such that converting said sequence of acoustic units to a sequence of speech vectors comprises retrieving the voice characteristic dependent weights for said selected voice characteristics, wherein the parameters are provided in clusters, and each cluster comprises at least one sub-cluster, wherein said voice characteristic dependent weights are retrieved for each cluster such that there is one weight per sub-cluster,
the method comprising:
receiving a new input audio file;
calculating the weights applied to the clusters to maximize the similarity between the generated speech and the new audio file.

15. The method according to claim 14, further comprising:
creating a new cluster using the data from the new audio file; and
calculating the weights applied to the clusters including the new cluster to maximize the similarity between the generated speech and the new audio file.

16. The method according to claim 14, further comprising:
determining linear transforms to be applied to maximize the similarity between the generated speech and the new audio file.

17. A text-to-speech system for use for simulating a plurality of different voice characteristics,
said system comprising:
a text input for receiving inputted text;
a processor configured to:
divide said inputted text into a sequence of acoustic units;
allow selection of voice characteristics for the inputted text;
convert said sequence of acoustic units to a sequence of speech vectors using an acoustic model, wherein said model has a plurality of model parameters describing probability distributions which relate an acoustic unit to a speech vector; and output said sequence of speech vectors as audio with said selected voice characteristics, wherein a parameter of a predetermined type of each probability distribution in said selected voice characteristics is expressed as a weighted sum of parameters of the same type, and wherein the weighting used is voice characteristic dependent, such that converting said sequence of acoustic units to a sequence of speech vectors comprises retrieving the voice characteristic dependent weights for said selected voice characteristics, wherein the parameters are provided in clusters, and each cluster comprises at least one sub-cluster, wherein said voice characteristic dependent weights are retrieved for each cluster such that there is one weight per sub-cluster.

18. An adaptable text-to-speech system, configured to output speech with voice characteristics provided in an audio file, said text-to-speech system comprising:

a processor configured to:

receive a text input;

divide said inputted text into a sequence of acoustic units;

select voice characteristics for the inputted text;

convert said sequence of acoustic units to a sequence of speech vectors using an acoustic model, wherein said model has a plurality of model parameters describing probability distributions which relate an acoustic unit to a speech vector; and output said sequence of speech vectors as audio with said selected voice characteristics, wherein a parameter of a predetermined type of each probability distribution in said selected voice characteristics is expressed as a weighted sum of parameters of the same type, and wherein the weighting used is voice characteristic dependent, such that converting said sequence of acoustic units to a sequence of speech vectors comprises retrieving the voice characteristic dependent weights for said selected voice characteristics, wherein the parameters are provided in clusters, and each cluster comprises at least one sub-cluster, wherein said voice characteristic dependent weights are retrieved for each cluster such that there is one weight per sub-cluster, the system further comprising a memory configured to store the said parameters provided in clusters and sub-clusters and the weights for said sub-clusters, the system being further configured to receive a new input audio file;

the processor being configured to re-calculate the weights applied to the sub-clusters to maximize the similarity between the generated speech and the new audio file.

19. A non-transitory carrier medium comprising computer readable code configured to cause a computer to perform the text-to-speech method of claim 1.

20. A non-transitory carrier medium comprising computer readable code configured to cause a computer to perform the method of claim 14.

* * * * *